United States Patent
Pan et al.

(10) Patent No.: US 10,505,860 B1
(45) Date of Patent: Dec. 10, 2019

(54) SYSTEM AND METHOD FOR ROUND ROBIN SCHEDULING

(71) Applicant: Xilinx, Inc., San Jose, CA (US)

(72) Inventors: Chuan Cheng Pan, San Jose, CA (US); Kiran S. Puranik, Fremont, CA (US)

(73) Assignee: XILINX, INC., San Jose, CA (US)

( * ) Notice: Subject to any disclaimer, the term of this patent is extended or adjusted under 35 U.S.C. 154(b) by 112 days.

(21) Appl. No.: 15/608,762

(22) Filed: May 30, 2017

(51) Int. Cl.
*H04L 12/863* (2013.01)
*G06F 9/48* (2006.01)
*H04L 12/721* (2013.01)
*H04L 12/54* (2013.01)
*G06F 13/364* (2006.01)
*G06F 9/52* (2006.01)

(52) U.S. Cl.
CPC ........ *H04L 47/6225* (2013.01); *G06F 9/4881* (2013.01); *G06F 9/52* (2013.01); *G06F 13/364* (2013.01); *H04L 12/56* (2013.01); *H04L 45/12* (2013.01); *H04L 45/72* (2013.01)

(58) Field of Classification Search
None
See application file for complete search history.

(56) References Cited

U.S. PATENT DOCUMENTS

| | | | | |
|---|---|---|---|---|
| 5,016,162 A | * | 5/1991 | Epstein | G06F 13/374 710/242 |
| 5,564,062 A | * | 10/1996 | Meaney | G06F 13/364 710/111 |
| 5,630,166 A | * | 5/1997 | Gamache | G06F 9/52 710/107 |
| 5,684,971 A | * | 11/1997 | Martell | G06F 9/3836 712/214 |
| 5,880,978 A | | 3/1999 | Panwar et al. | |
| 6,157,989 A | * | 12/2000 | Collins | G06F 13/18 710/116 |
| 6,266,379 B1 | | 7/2001 | Dally | |
| 6,424,655 B1 | * | 7/2002 | Horst | G06F 13/364 370/412 |
| 6,647,449 B1 | * | 11/2003 | Watts | G06F 13/364 710/111 |
| 7,054,330 B1 | * | 5/2006 | Chou | H04L 47/50 370/444 |
| 7,062,582 B1 | * | 6/2006 | Chowdhuri | G06F 13/364 370/462 |
| 9,100,015 B1 | | 8/2015 | Pan et al. | |

(Continued)

*Primary Examiner* — Phirin Sam
*Assistant Examiner* — Tarell A Hampton
(74) *Attorney, Agent, or Firm* — David O'Brien; Amir Tabarrok

(57) ABSTRACT

A scheduling system includes a request masking circuit configured to receive a plurality of original requests for priority arbitration among a plurality of entries, the plurality of original requests include a last original request and a first original request following the last original request. A last mask associated with a last grant result for the last original request is received from a mask generator circuit. A first masked request is generated by applying the last mask to the first original request. A request selection circuit is configured to generate a first selected request based on the first original request and the first masked request. The mask generator circuit is configured to generate a first mask based on the first selected request. The first mask is associated with a first grant result for the first original request.

20 Claims, 8 Drawing Sheets

(56) References Cited

U.S. PATENT DOCUMENTS

| | | | |
|---|---|---|---|
| 2002/0073282 A1* | 6/2002 | Chauvel | G06F 1/206 711/122 |
| 2003/0093630 A1* | 5/2003 | Richard | G06F 13/1626 711/154 |
| 2003/0140072 A1 | 7/2003 | Hoskote | |
| 2011/0252238 A1* | 10/2011 | Abuan | H04L 61/2575 713/168 |
| 2012/0173781 A1* | 7/2012 | Banerjee | G06F 13/364 710/111 |
| 2013/0103732 A1 | 4/2013 | Ansanaka | |
| 2013/0262546 A1 | 10/2013 | Shinomiya et al. | |
| 2014/0164863 A1* | 6/2014 | Leem | G06F 11/08 714/747 |
| 2014/0201471 A1* | 7/2014 | Cutter | G06F 13/1663 711/151 |
| 2015/0046678 A1* | 2/2015 | Moloney | G09G 5/397 712/29 |
| 2015/0049106 A1* | 2/2015 | Havlir | G06T 1/20 345/559 |
| 2017/0103022 A1* | 4/2017 | Kreinin | G06F 12/0842 |

* cited by examiner

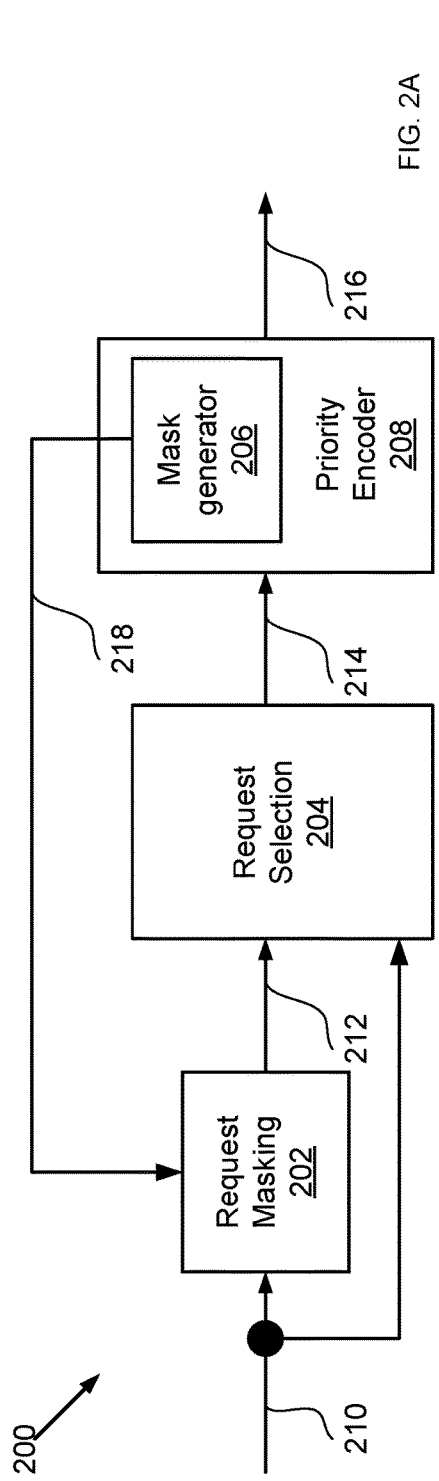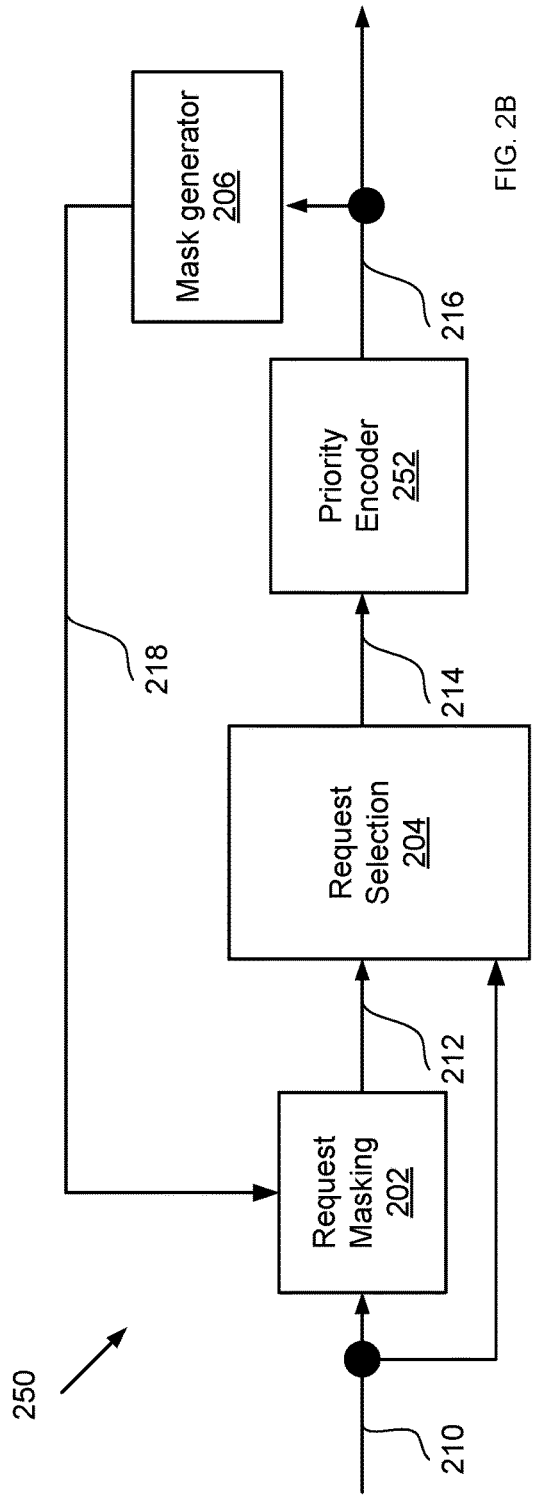

US 10,505,860 B1

SYSTEM AND METHOD FOR ROUND ROBIN SCHEDULING

TECHNICAL FIELD

Examples of the present disclosure generally relate to integrated circuits (ICs) and, in particular, to an embodiment related to a scheduling system performing arbitration for a shared resource for a plurality of requestors.

BACKGROUND

In signal processing, there often exists a requirement to share a common resource among a plurality of entries (e.g., requestors) for that common resource. A scheduling system performs priority arbitration for granting access to that common resource to a particular entry for a certain period. Such priority arbitration attempts to grant reasonable access to the shared resource for each of the plurality of entries. As the number of entries (also referred to as the entry count) increases, the complexity of the scheduling system increases. As such, performing the priority arbitration by the scheduling system for a larger entry count may require more area in an integrated circuit and causes longer delay in its logic path.

Accordingly, it would be desirable and useful to provide an improved scheduling system.

SUMMARY

In some embodiments in accordance with the present disclosure, a scheduling system includes a request masking circuit configured to: receive a sequence of original requests for priority arbitration among a plurality of entries, the sequence of original requests including a first original request following a last original request; receive, from a mask generator circuit, a last mask associated with a last grant result for the last original request, the last grant result assigning priority to a last granted entry of the plurality of entries; and generate a first masked request by applying the last mask to the first original request; a request selection circuit configured to generate a first selected request based on the first original request and the first masked request; and the mask generator circuit configured to generate a first mask based on the first selected request, wherein the first mask is associated with a first grant result for the first original request, the first grant result assigning priority to a first granted entry of the plurality of entries.

In some embodiments, the scheduling system includes a priority encoder circuit configured to receive the first selected request and generate the first grant result based on the first selected request.

In some embodiments, the request selection circuit is configured to determine that the first masked request includes at least one entry request from one of the plurality of entries; and generate the first selected request by selecting the first masked request.

In some embodiments, the request selection circuit is configured to determine that the first masked request does not include any entry request from one of the plurality of entries; and generate the first selected request by selecting the first original request.

In some embodiments, the request selection circuit includes a multiplexer for generating the first selected request.

In some embodiments, the priority encoder circuit includes a find-first-set bit circuit configured to identify a least significant position of a bit set to one in the first selected request. The first grant result assigns the priority based on the least significant position.

In some embodiments, the mask generator circuit includes a translator circuit configured to: receive the first selected request having n bits; generate n n-bit patterns, each pattern corresponding to one bit position of the first selected request; wherein in response to the one bit position of the first selected request having a logic 1 value, the translator circuit is configured to generate the corresponding pattern having a logic 1 value in a corresponding bit position of the n-bit pattern, a logic 1 value in each bit position left of the corresponding bit position of the n-bit pattern, and a logic 0 value in each bit position right of the corresponding bit position of the corresponding pattern; wherein in response to the one bit position of the first selected request having a logic 0 value, the translator circuit is configured to generate the corresponding pattern having a logic 0 value in each bit position of the corresponding pattern; a merger circuit coupled to receive the n n-bit patterns and configured to combine the n n-bit patterns into one merged n-bit pattern; and a shift circuit coupled to receive the merged n-bit pattern and configured to generate the first mask by left shifting the merged n-bit pattern by one bit with a logic 0 value shifted in.

In some embodiments, in the find-first-set bit circuit includes an edge detector circuit configured to: receive the merged n-bit pattern and the first mask; and generate the first grant result using the merged n-bit pattern and the first mask.

In some embodiments, the first grant result is generated by applying a bit-wise logic XOR function to the merged n-bit pattern and the first mask.

In some embodiments, the mask generator circuit is configured to: receive the first grant result from the priority encoder circuit; and generate the first mask using the first grant result.

In some embodiments, a method includes receiving a sequence of original requests for priority arbitration among a plurality of entries, the sequence of original requests including a first original request following a last original request; receiving, from a mask generator circuit, a last mask associated with a last grant result for the last original request, the last grant result assigning priority to a last granted entry of the plurality of entries; and generate a first masked request by applying the last mask to the first original request; generating, by a request selection circuit, a first selected request based on the first original request and the first masked request; and generating a first mask based on the first selected request, wherein the first mask is associated with a first grant result for the first original request, the first grant result assigning priority to a first granted entry of the plurality of entries.

In some embodiments, the method includes generating, by a priority encoder circuit, the first grant result based on the first selected request.

In some embodiments, the method includes determining that the first masked request includes at least one entry request from one of the plurality of entries; and generating the first selected request by selecting the first masked request.

In some embodiments, the method includes determining that the first masked request does not include any entry request from one of the plurality of entries; and generating the first selected request by selecting the first original request.

In some embodiments, the method includes generating, using a multiplexer in the request selection circuit, the first selected request.

In some embodiments, the method includes identifying, by a find-first-set bit circuit included in the find-first-set circuit, a least significant position of a bit set to one in the first selected request, wherein the first grant result assigns the priority based on the least significant position.

In some embodiments, the method includes receiving, by a translator circuit of the mask generator circuit, the first selected request having n bits; generating, by the translator circuit of the mask generator circuit, n n-bit patterns, each pattern corresponding to one bit position of the first selected request; wherein in response to the one bit position of the first selected request having a logic 1 value, the translator circuit is configured to generate the corresponding pattern having a logic 1 value in a corresponding bit position of the n-bit pattern, a logic 1 value in each bit position left of the corresponding bit position of the n-bit pattern, and a logic 0 value in each bit position right of the corresponding bit position of the corresponding pattern; wherein in response to the one bit position of the first selected request having a logic 0 value, the translator circuit is configured to generate the corresponding pattern having a logic 0 value in each bit position of the corresponding pattern; combining, by a merger circuit of the mask generator circuit, the n n-bit patterns into one merged n-bit pattern; and generating the first mask by left shifting the merged n-bit pattern by one bit with a logic 0 value shifted in.

In some embodiments, the method includes receiving, by an edge detector of the find-first-set bit circuit, the merged n-bit pattern and the first mask; and generating, by an edge detector, the first grant result using the merged n-bit pattern and the first mask.

In some embodiments, the method includes generating the first grant result by applying a bit-wise logic XOR function to the merged n-bit pattern and the first mask.

In some embodiments, the method includes receiving the first grant result from the priority encoder circuit; and generating the first mask using the first grant result.

Other aspects and features will be evident from reading the following detailed description and accompanying drawings.

BRIEF DESCRIPTION OF THE DRAWINGS

FIG. 2A is a block diagram illustrating an exemplary scheduling system according to some embodiments of the present disclosure.

FIG. 2B is a block diagram illustrating another exemplary scheduling system according to some embodiments of the present disclosure.

DETAILED DESCRIPTION

Figure 1:
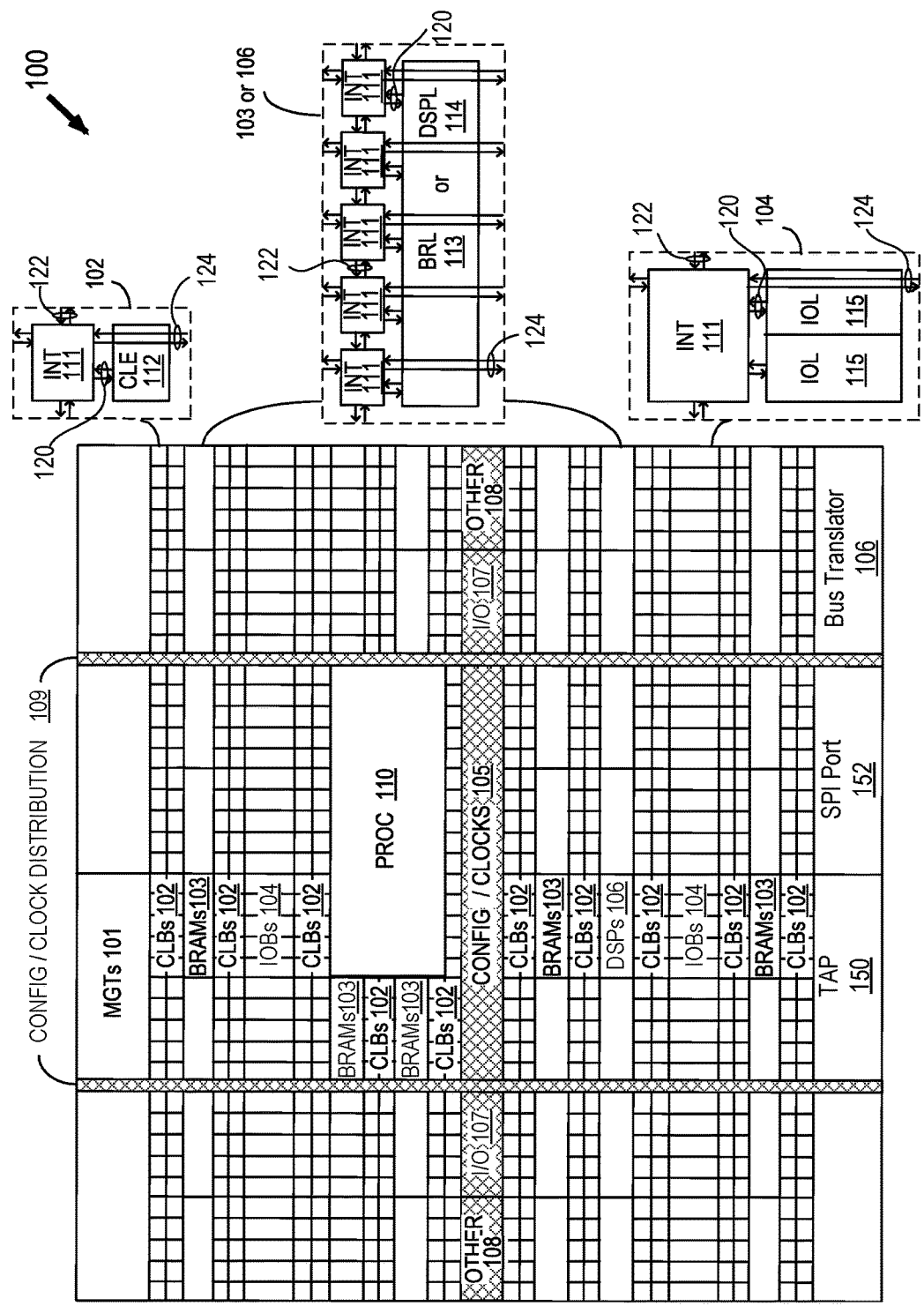
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. A scheduling system may implement various priority arbitration schemes (e.g., fixed priority arbitration, round robin arbitration, weighted round robin arbitration), and be used in many areas where priority arbitration among multiple entries is needed. For example, in bus management, a scheduling system implementing a round-robin arbiter may be used to fairly choose a requestor to provide the requestor access to a bus. For further example, in tag management, a round-robin arbiter may be used to determine an available tag for a transaction. In that example, a tag following the previously chosen tag may be selected for the transaction. In yet another example, in weighted round-robin arbitration, a round-robin arbiter may be used to pick the next phase to perform the weighted round-robin arbitration.

As discussed above, as the entry count of a scheduling system increases, the complexity of the scheduling system also increases, which requires more area in an IC and causes a longer delay. In some embodiments, a scheduling system uses a round-robin arbiter including N fixed-priority encoders (also referred to as an N-fixed-priority encoder design). In such an N-fixed-priority-encoder design, an N-entry round-robin arbiter requires N fixed priority encoders. Each fixed priority encoder has a different priority, and may be chosen by a state machine based on the previous grant results of the scheduling system. Such an N-fixed-priority encoder design has both time and area scaling issues when the entry count increases, as more fixed priority encoders and a longer logic path for the fixed priority encoders are required when the entry count increases.

In some embodiments, a scheduling system uses a round-robin arbiter including two priority encoders (also referred to as a 2-priority-encoder design). One of the priority encoders is a programmable thermal priority encoder configured to search from the previously granted entry to the last entry. The other priority encoder is a fixed priority encoder configured to search from the first entry to the last entry. In the first round of priority arbitration, the programmable thermal priority encoder searches from the first entry because there is no previously granted entry. In a following round of priority arbitration, the programmable thermal priority encoder searches from the previously granted entry to the last entry. If the programmable thermal priority encoder fails to find any entry request during the search, the round-robin arbiter uses the other fixed priority encoder to search from the first entry to the last entry. Compared to the N-fixed-priority-encoder design, by utilizing a programmable thermal priority encoder to replace the N−1 fixed priority encoders in the N-fixed-priority-encoder design, the 2-priority-encoder design uses two priority encoders regardless of the size of the entry count, thereby providing area scaling improvements. However, the 2-priority-encoder design still has the time scaling issue, because as the entry count N increases, a longer logic path delay for both the programmable thermal priority encoder and the fixed priority encoders is required.

For integrated circuit (IC) solutions, it has been discovered that both the timing and area performance of a scheduling system including a round-robin arbiter may be improved by utilizing a mask including previously granted entry information for the new requests. With the above general understanding borne in mind, various embodiments for scheduling are generally described below. Various advantages may be present in various applications of the present disclosure. No particular advantage is required for all embodiments, and different embodiments may offer different advantages. One of the advantages of some embodiments is that by utilizing a find-first-set bit circuit and a mask including a continuous bit pattern generated by the find-first-set bit circuit, a round-robin arbiter needs only one priority encoder regardless of the entry count. Such a single-priority-encoder structure for the round-robin arbiter provides savings in area and reduction in delay when the entry count increases. For example, by masking new entry requests with the mask including the previously granted entry information, the round-robin arbiter may determine if any new request is within the entries after that previously granted entry, and generate a selected request based on that determination. By providing that selected request to the priority encoder, the round-robin arbiter may use a single priority encoder to generate the grant result. Another advantage of some embodiments is that by using a mask including a pattern intermediately generated in the find-first-set bit circuit for providing a grant result, no additional delay is caused by generating the mask. Yet another advantage of some embodiments is that the priority encoder in the round-robin arbiter may be implemented in different ways, including for example, the find-first-set bit circuit. In those embodiments, by using a mask generated based on the grant result generated by the priority encoder, more flexibility in the round-robin arbiter is achieved.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the scheduling is not limited to the exemplary IC depicted in FIG. 1, and that IC having other configurations, or other types of IC, may also implement the scheduling system.

Referring to FIG. 2A, a scheduling system 200 is illustrated. The scheduling system 200 includes a request masking circuit 202, a request selection circuit 204, a mask generator circuit 206, and a priority encoder circuit 208. While an exemplary four-entry scheduling system for arbitrating among four entries including first, second, third, and fourth entries are used in the description below, the scheduling system may be implemented for arbitrating among any number (e.g., 16, 32, 64) of entries.

In some embodiments, in the $m^{th}$ round of scheduling performed by the scheduling system 200, the request masking circuit 202 receives the original request 210-$m$. In an example, the original request 210-$m$ (denoted as Req[3:0]) has a value of 4'b1110. In that example, the bits at bit positions 2, 3, and 4 of the original request 210-$m$ have a logic 1 value, which indicates that the original request 210-$m$ includes three entry requests from the corresponding second, third, and fourth entries respectively.

In some embodiments, in the $m^{th}$ round of scheduling performed by the scheduling system 200, the request masking circuit 202 also receives a mask 218-($m$−1) generated during the preceding (m−1)th round of scheduling. The mask 218-($m$−1) may provide an indication for the entry to be granted in the current $m^{th}$ round. For example, the mask 218-($m$−1) has a value of 4'b1100. In that example, the bits at bit positions 3 and 4 of the mask 218-($m$−1) have a logic 1 value. The rightmost bit position (e.g., 3) of the mask 218-($m$−1) that has a logic 1 value may be used to determine the possible rightmost possible granted entry during the current $m^{th}$ round of scheduling.

In some embodiments, the mask 218-($m$−1) may be associated with the grant result 216-($m$−1) generated by the priority encoder circuit 208 in the (m−1)th round of scheduling. In an example, the priority encoder circuit 208 includes a find-first-set bit circuit, and generates the grant result 216-($m$−1) having a value of 4'b0010 indicating that the second entry is granted during the (m−1)th round of scheduling. As such, the bit position 2 of the grant result 216-($m$−1) is also referred to as the grant bit position. In that example, the mask 218-($m$−1) has a value of 4'b1100, where all bits at bit positions (e.g., 3 and 4) to the left of the grant bit position (e.g., 2) during the (m−1)th round of scheduling have a logic 1 value, and all other bits (e.g., 1 and 2) having a logic 0 value. Such a mask 218-($m$−1) may be used to determine whether any of the entry requests in the original request 210-$m$ is for an entry (e.g., 3) after the previously granted entry (e.g., 2).

In some embodiments, the request masking circuit 202 may perform a request masking process to mask the original request 210-$m$ using the mask 218-($m$−1) and generate a masked request 212. In an example, during the $m^{th}$ round of scheduling, the original request 210-$m$ has a value of 4'b1110 and the mask 218-($m$−1) has a value of 4'b1100. In that example, the request masking circuit 202 generates a masked request 212-$m$ having a value of 4'b1100. The bits at bit positions 3 and 4 of the masked request 212-$m$ have a logic 1 value, indicating that the masked request 212-$m$ includes two valid entry requests corresponding to the third and fourth entries respectively, both are after the previously granted second entry. In another example, the original request 210-$m$ has a value of 4'b1001 including entry requests from the first entry and the fourth entry. In that example, using the mask 218-($m$−1) with a value of 4'b1100, the request masking circuit 202 generates a masked request 212-$m$ having a value of 4'b1000.

In some embodiments, the request selection circuit 204 receives the original request 210-$m$ and the masked request 212-$m$, and generates a selected request 214-$m$. The selected request 214-$m$ may be determined based on whether the masked request 212-$m$ includes any entry requests. In an example, the masked request 212-$m$ has a value of 4'b1100. The request selection circuit 204 determines that the masked request 212-$m$ has one or more entry requests (e.g., entry requests from the third and fourth entries), and selects the masked request 212-$m$ having a value of 4'b1100 as its output denoted as the selected request 214-$m$. In another example, the masked request 212-$m$ has a value of 4'b0000. In that example, the request selection circuit 204 determines that the masked request 212-$m$ has no entry requests, and selects the original request 210-$m$ as the output selected request 214-$m$.

In some embodiments, the selected request 214-$m$ is provided to a priority encoder circuit 208 including the mask generator circuit 206. In an example, the priority encoder circuit 208 implements a find-first-set bit logic. After receiving a selected request 214-$m$ having a value of 4'b1100, the priority encoder circuit 208 determines that the third entry is granted based on the find-first-set bit logic. The priority encoder circuit 208 generates a grant result 216-$m$ having a value of 4'b0100, where the bit at bit position 3 corresponding to the granted entry has a logic 1 value, and all other bits have a logic 0 value. In that example, the mask generator circuit 206 generates a mask 218-$m$ having a value of 4'b1000 corresponding to the grant result 216-$m$. Specifically, the mask 218-$m$ has a pattern where each bit to the left of the bit position 3 corresponding to the granted entry has a logic 1 value, and all other bits have a logic 0 value. The mask 218-$m$ having a value of 4'b1000 indicates that during the (m+1)th round of scheduling, the fourth entry corresponding to the bit position 4 having a logic 1 value in the mask 218-$m$ is to be granted.

In some embodiments, the mask 218-$m$ is sent from the mask generator circuit 206 to the request masking circuit 202, which uses the mask 218-$m$ in the (m+1)th round of scheduling.

In some embodiments, during the (m+1)th round of scheduling, the request masking circuit 202 receives an original request 210-($m$+1) having a value 4'b1100 and the mask 218-$m$ having the value of 4'b1000. The request masking circuit 202 then generates a masked request 212-($m$+1) having a value of 4'b1000, indicating that the masked request 212-($m$+1) includes a valid entry request from the fourth entry. After determining that the masked request 212-($m$+1) includes one or more entry requests, the request selection circuit 204 generates a selected request 214 having the same value as the masked request 212-($m$+1), which is 4'b1000. The priority encoder circuit 208 implementing a find-first-set bit logic may determine that the grant bit position is four, and generates a grant result 216-($m$+1) having a value of 4'b1000 indicating that the fourth entry is granted during the (m+1)th round of scheduling. The mask generator circuit 206 may generate a mask 218-($m$+1) having a value of 4'b0000. Because the granted bit position 4 is the leftmost bit position, bits at all bit positions of the mask 218-($m$+1) have a logic 0 value. The mask 218-($m$+1) is then sent to the request masking circuit 202 for the (m+2)th round of scheduling.

In some embodiments, during the (m+2)th round of scheduling, the request masking circuit 202 receives an original request 210-($m$+2) having a value of 4'b0010, indicating that it includes an entry request from the second entry. The request masking circuit 202 applies the mask 218-($m$+1) having a value of 4'b0000 to the original request 210-($m$+2) to generate a masked request 212-($m$+2), which has a value of 4'b0000. The request selection circuit 204 determines that the masked request 212-(m+2) does not have any entry request (e.g., based on that all bits in the masked request 212-(m+2) has a logic 0 value), and selects the original request 210-(m+2) as the selected request 214. As such, the selected request having a value of 4'b0010 is sent to the priority encoder circuit 208, which grants entry corresponding to the first bit position (e.g., 2) having a logic 1 value. A grant result 216-(m+2) having a value of 4'b0010 is generated. A mask 218-(m+2) having a value of 4'b1100 is then provided to the request masking circuit 202 for the next (m+1)th round of scheduling.

Referring to FIG. 2B, a scheduling system 250 is illustrated. The scheduling system 250 is substantially similar to the scheduling system 200 as described above except the differences described below. In the example of FIG. 2B, the mask generator circuit 206 receives the grant result 216 from the priority encoder circuit 252, and generates a mask 218 based on the grant result 216. In the mask 218, all bits at bit positions left to the grant bit position have a logic 1 value, and all other bits have a logic 0 value. By generating the mask 218 from the grant result 216, more design flexibility in the priority encoder circuit 252 is achieved. In other words, the priority encoder circuit 252 may not generate the mask 218 as an intermediate pattern for generating the grant result 216.

Figure 3:
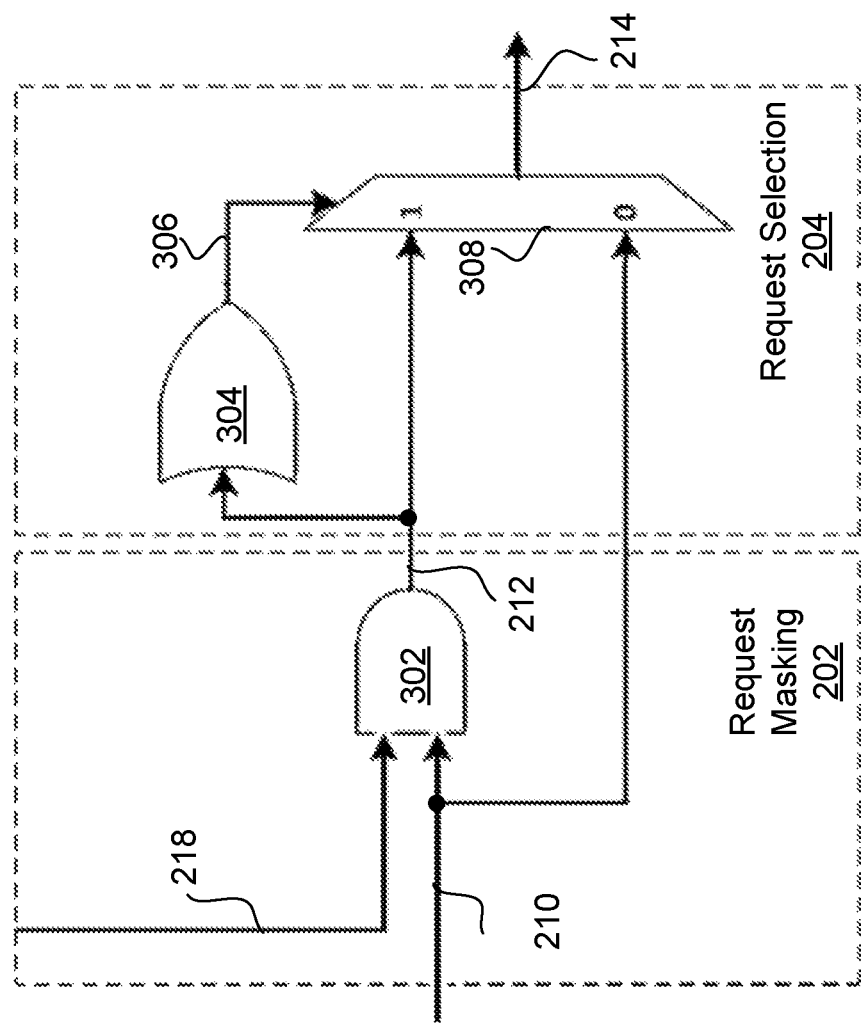
FIG. 3 is a block diagram illustrating a request masking circuit and a request selection circuit according to some embodiments of the present disclosure.

Referring to FIG. 3, illustrates is an exemplary request masking circuit 202 coupled to a request selection circuit 204. The request masking circuit 202 includes an AND gate 302. The AND gate 302 may apply a bit-wise logic AND function to corresponding bits of the original request 210 and the mask 218, and generate a masked request 212.

The request selection circuit 204 includes a multiplexer 308 receiving the masked request 212 and the original request 210. An OR gate 304 is configured to receive the masked request 212. The OR gate 304 may apply a bit-wise logic OR function to all the bits of the masked request 212 and generates a request selector 306 indicating whether the masked request 212 includes any entry request. The request selector 306 is sent to a select line of the multiplexer 308. In an example, the request selector 306 has a logic 1 value indicating that the masked request 212 includes one or more entry requests. In that example, the multiplexer 308 selects the masked request 212 as its output, which is referred to as the selected request 214. In another example, the request selector 306 has a logic 0 value indicating that the masked request 212 includes no entry requests. In that example, the multiplexer 308 selects the original request 210 as its output, which is referred to as the selected request 214.

Figure 4:
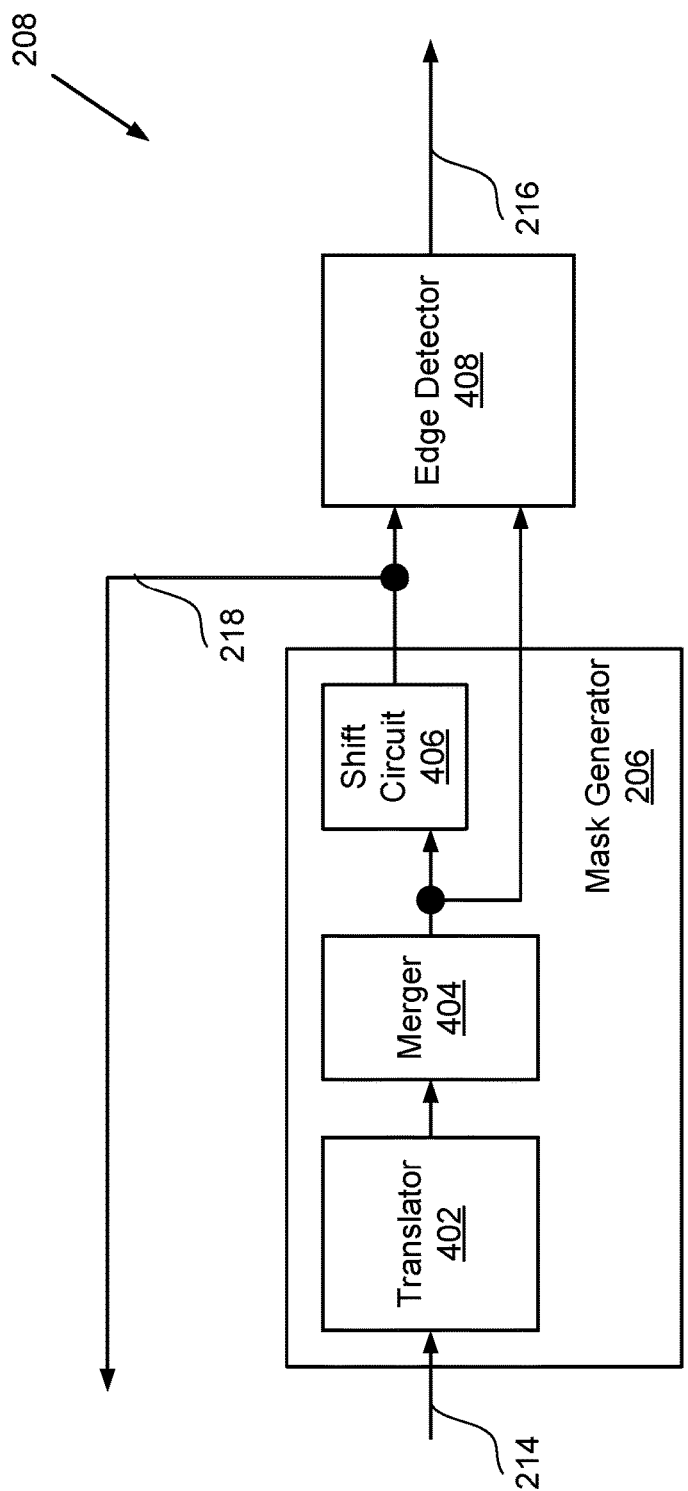
FIG. 4 is a block diagram illustrating a priority encoder circuit according to some embodiments of the present disclosure.

Referring to FIG. 4, illustrated is an exemplary priority encoder circuit 208. The priority encoder circuit 208 includes a mask generator circuit 206 and an edge detector circuit 408. The mask generator circuit 206 includes a translator circuit 402 receiving the selected request 214 having n bits. For each of the n bits, the translator circuit 402 generates an n-bit pattern corresponding to the bit position of that particular bit based on the value of that particular bit. In an example, a particular bit at bit position i of the selected request 214 has a logic 1 value. In that example, the corresponding n-bit pattern may be provided as n'b1 . . . 10 . . . 0. In that pattern, bits at the bit position i and bit positions left to i have a logic 1 value, and other bits have a logic 0 value. In another example, a particular bit at bit position i of the selected request 214 has a logic 0 value. In that example, the corresponding n-bit pattern may be provided as n'b0 . . . 0. In that pattern, all bits have a logic 0 value.

A merger circuit 404 may receive the n n-bit patterns from the translator circuit 402, and combine them (e.g., using bit-wise OR operation) to generate a merged pattern. A shift circuit 406 may left shift the merged pattern by one bit with a logic 0 value shifted in to generate the mask 218. Both the merged pattern and the shifted merged pattern are provided to an edge detector circuit 408, which determines the grant bit position, and generate an output n-bit pattern 216 having a logic 1 value in the grant bit position and a logic 0 value in every other bit position. In an example, the grant bit position is determined by detecting the rightmost bit in the selected request 214 that has a logic 1 value.

Figure 5:
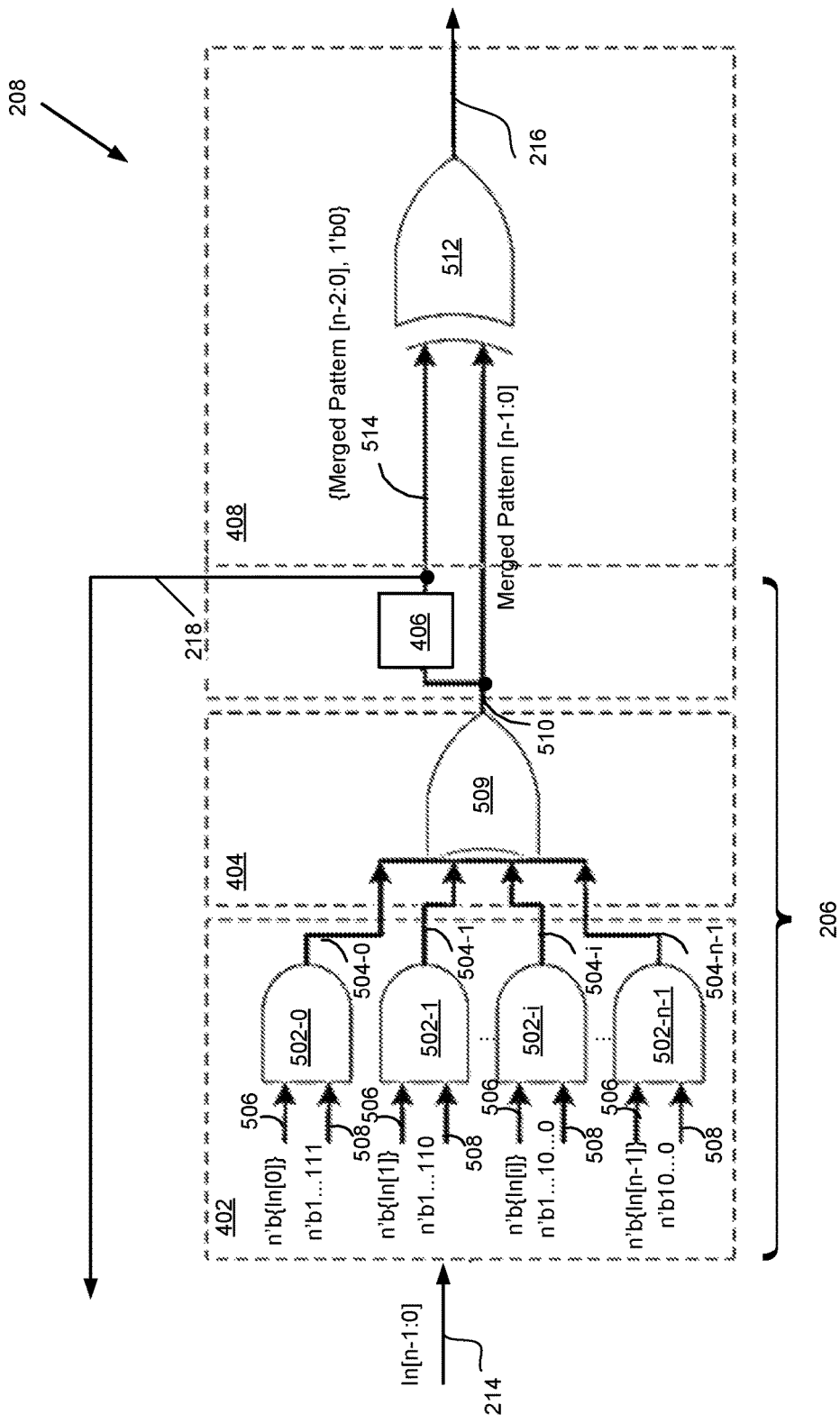
FIG. 5 is a block diagram illustrating a priority encoder circuit including a find-first-set bit circuit according to some embodiments of the present disclosure.

Referring to FIG. 5, illustrated is an exemplary priority encoder circuit implementing find-first-set bit logic according to some embodiments of the present disclosure. The priority encoder circuit 208 is substantially similar to the priority encoder circuit 208 described in FIG. 4 except the differences described below. The priority encoder circuit 208 includes a mask generator circuit 206, which includes a translator circuit 402, the merger circuit 404, the shift circuit 406, and the edge detector circuit 408. The n bits of the selected request 214 (also referred to as input word 214) are input to a translator circuit 402. The translator circuit 402 includes n n-bit bitwise AND circuits 502-0 through 502-(n−1). Each AND circuit 502-i generates an n-bit pattern 504-i corresponding to the $i^{th}$ bit position of the input word, where 0<=i<=n−1. In response to a bit position p of the input word 214 having a logic 1 value, the respective AND circuit 502-i generates a corresponding pattern 504-i. The n-bit pattern 504-i has a logic 1 value in the bit position i and in each bit position left to the bit position i, and a logic 0 value in each bit position right of the corresponding bit position i. In response to a bit position i of the input word 214 having a logic 0 value, the respective AND circuit 502-i generates the corresponding pattern 504-i having a logic 0 value in each bit position of the n-bit pattern 504-i.

Each AND circuit 502-i has two n-bit input operands 506 and 508. The input operand 506 is n bits all having the same logic value as the corresponding $i^{th}$ bit of the input word 214. That is, the input operand 506 of the logic AND circuit 502-i has n bits having logic values equal to the logic value of bit i of the input word 214. This is denoted as n'b{In{i}}, where i is the corresponding bit position in the input word 214. For example, the AND circuit 502-0 corresponds to bit 0 of the input word 214, and input operand 506 is n bits having logic values the same as the logic value of bit 0 of the input word 214. For further example, the AND circuit 502-1 corresponds to bit 1 of the input word 214, and input operand 506 is n bits having logic values the same as the logic value of bit 1 of the input word 214.

The input operand 508 to the AND circuit 502-i has a pattern of logic values, in which for bit i of the input word 214, the input operand 508 has bit i and all bits left of bit i set to a logic 1 value. All bits right of bit i are assigned a logic 0 value. Specifically, the input operand 508 of the logic AND circuit 502-i has bit i through n−1 equal to a logic 1 value, and any remaining bits equal to a logic 0 value. For example, the AND circuit 502-0 has the n-bit input 508 of n'b1 . . . 111, which indicates an n-bit input having a logic 1 value in bits 0 through n−1. For further example, the AND circuit 502-1 has the n-bit input 508 of n'b1 . . . 110, which indicates an n-bit input having logic values in bits 1 through n−1, and a logic 0 value in bit 0.

The n n-bit patterns 504-0 through 504-(n−1) provided by the AND circuits 502-0 through 502-(n−1) respectively are input to the merger circuit 404. The merger circuit 404 combines the n n-bit patterns 504-0 through 504-(n−1) into one n-bit merged pattern 510. In the merged pattern 510, the bit corresponding to the rightmost (least significant) bit in the input word 214 has a logic 1 value, and all bits left (more significant) have a logic 1 value. All bits to the right (less significant) have a logic 0 value. In some examples, the merger circuit 404 includes an OR circuit 509 that applies a bitwise OR function to corresponding bits of the n-bit patterns 504-0 through 504-($n$–1) to generate the merged pattern 510.

The merged pattern 510 is input to a shift circuit 406 to generate a shifted merged pattern 514. The shifted merged pattern 514 may be generated by left shifting the merged pattern 510 by one bit with a logic 0 value shifted in. The shifted merged pattern 514 is denoted as {merged pattern [n–2:0], 1'b0}. In the illustrated example, the shifted merged pattern 514 is provided as a mask 218 by the mask generator circuit 206.

The merged pattern 510 and the shifted merged pattern 514 are provided to the edge detector circuit 408. The edge detector circuit 408 generates an output n-bit pattern 216 (also referred to as a grant result 216) having a logic 1 value in a particular bit position, and a logic 0 value in every other bit position. That particular bit position in the grant result 216 that has a logic 1 value is equal to the rightmost bit position of the input word 214 having a logic 1 value. In an example, the edge detector circuit 408 includes an XOR circuit 512. The XOR circuit 512 applies a bit-wise logic XOR function to the merged pattern 510 and the shifted merged pattern 514 to generate the grant result 216. The grant result 216 assigns priority to an entry corresponding to the bit position having a logic 1 value. That bit position is referred to as a grant bit position, and that entry is referred to as the granted entry.

Figure 6:
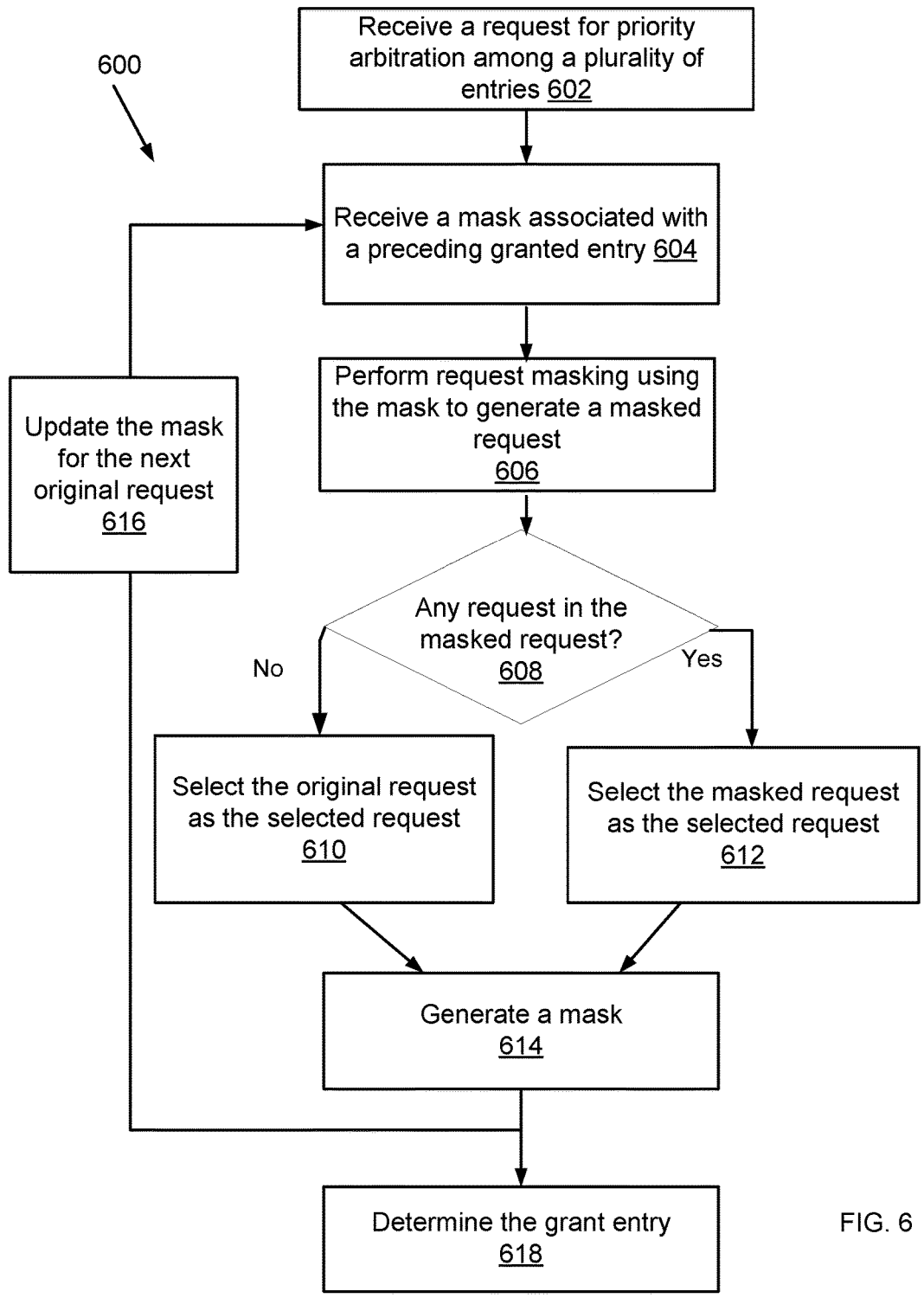
FIG. 6 is a flow diagram illustrating an exemplary method for scheduling for a plurality of entries according to some embodiments of the present disclosure.

Referring to FIG. 6, illustrated is a flowchart of a method 600 of scheduling. At block 602, an original request 210 is received by a scheduling system 200. In an example, the original request 210 is the $m^{th}$ request received by the scheduling system 200, and is denoted as the original request 210-$m$. At block 604, the request masking circuit 202 receives a mask 218-($m$–1) associated with a preceding grant result 216-($m$–1) associated with a preceding original request 210-($m$–1). At block 606, the request masking circuit 202 performs a request masking to the original request 210-$m$ using the mask 218-($m$–1), and generates a masked request 212-$m$.

The method 600 may then proceed to block 608, where it is determined whether there is any request in the masked request 212-$m$. In an example, at block 608, the request selection circuit 204 determines that there is no request in the masked request 212-$m$. In that example, the method 600 proceeds to block 610, where the request selection circuit 204 chooses the original request 210-$m$ as the selected request 214-$m$. In another example, at block 608, the request selection circuit 204 determines that there is a request in the masked request 212-$m$, and proceed to block 612, where the request selection circuit 204 chooses the masked request 212-$m$ as the selected request 214-$m$.

The method 600 may then proceed to block 614, where a mask 218-$m$ associated with a grant result 216-$m$ associated with the original request 210-$m$. At block 616, the mask 218-$m$ is sent to the request masking circuit 202, such that the request masking circuit 202 may use the mask 218-$m$ for masking the next original request 210-($m$+1). The method 600 then proceeds to block 618, where a priority encoder circuit 208 generates a grant result 216-$m$. In an example, the grant result 216-$m$ is generated based on the mask 218-$m$.

Figure 7:
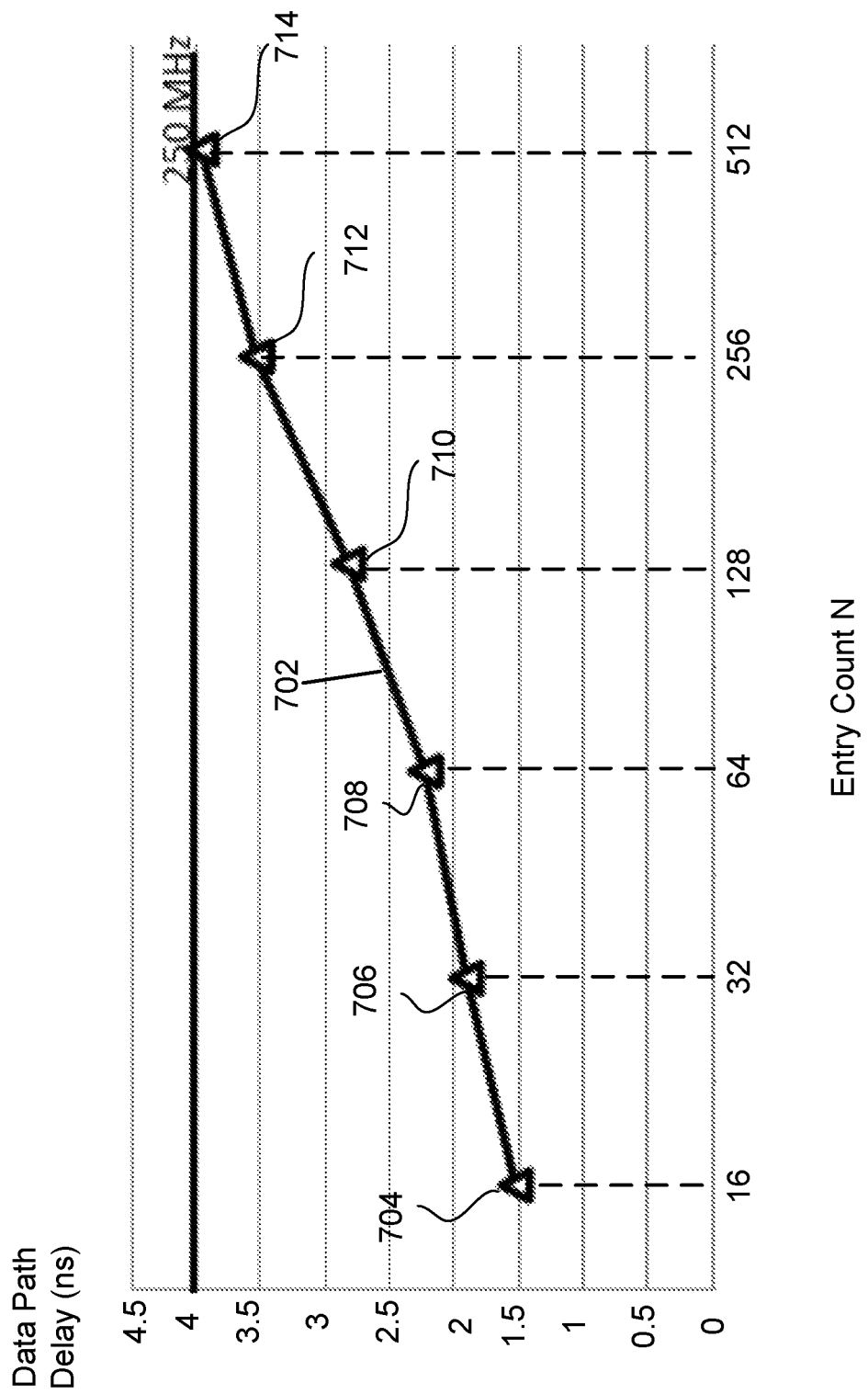
FIG. 7 illustrates a data path delay versus entry count plot according to some embodiments of the present disclosure.

Referring to FIG. 7, illustrated is a data path delay curve 702 for a scheduling system (e.g., a scheduling system 200 of FIG. 2) that uses a mask including previous grant result information. The curve 702 illustrates that for the scheduling system, the data path delay has a timing efficiency of O(log N). In a particular example, as shown by points 704, 706, 708, 710, 712, and 714 of curve 702, the scheduling system for the entry counts 16, 32, 64, 128, 256, and 512 has data path delays 1.523 ns, 1.899 ns, 2.222 ns, 2.817 ns, 3.531 ns, and 3.958 ns respectively.

Figure 8:
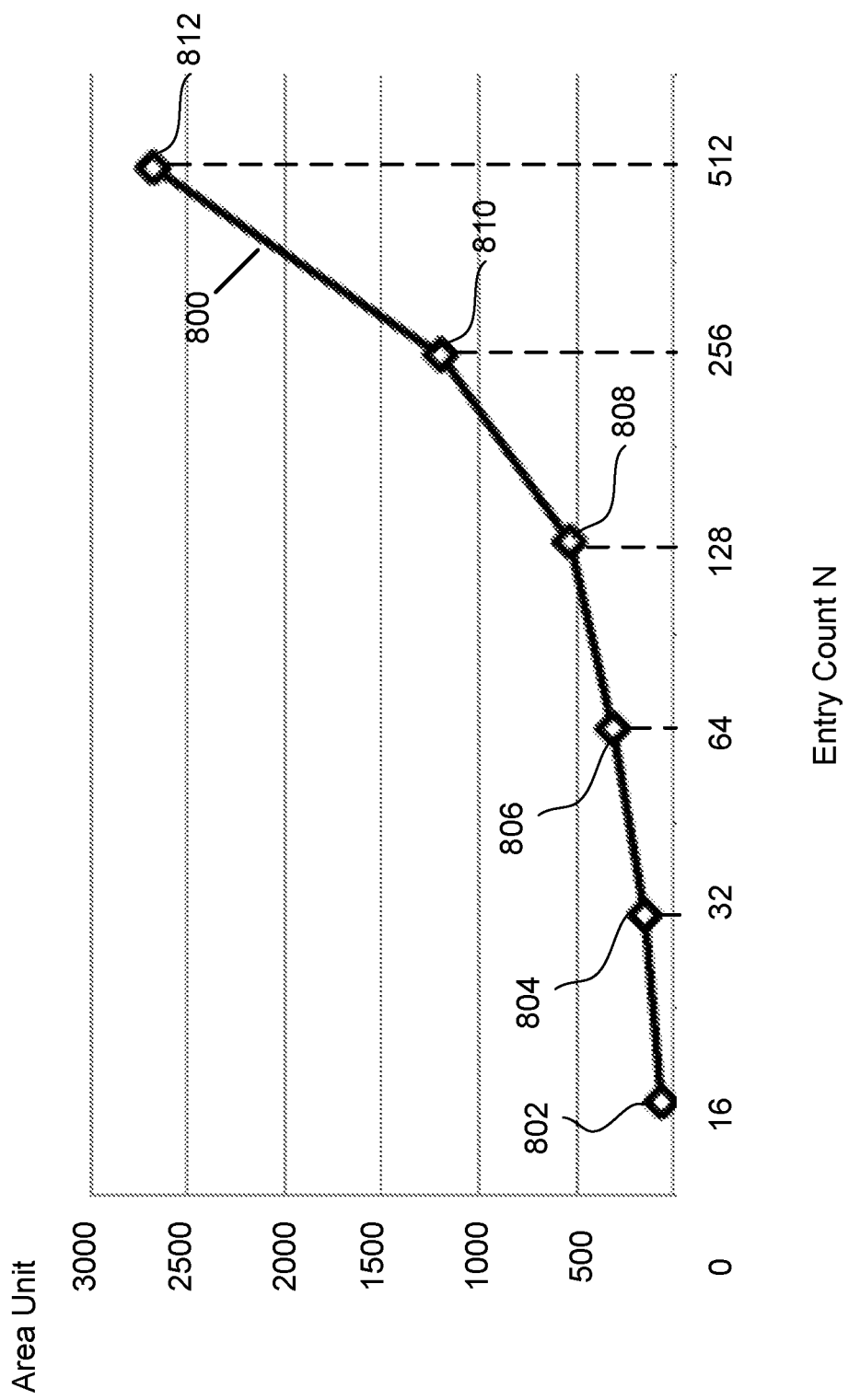
FIG. 8 illustrates an area unit versus entry count plot according to some embodiments of the present disclosure.

Referring to FIG. 8, illustrated therein is an area unit versus entry count plot. Curve 800 illustrates an area curve for a scheduling system 200. Points 802 through 812 of the curve 800 correspond to area units required for implementing the scheduling system 200 for various entry counts. In an example, each area unit corresponds to the area required by a look-up table used in the scheduling system 200. In that example, point 802 provides that 59 area units are used for a scheduling system 200 for 16 entry counts. Point 804 provides that 145 area units are used for a scheduling system 200 for 32 entry counts. Point 806 provides that 311 area units are used for a scheduling system 200 for 64 entry counts. Point 808 provides that 531 area units are used for a scheduling system 200 for 128 entry counts. Point 810 provides that 1197 area units are used for a scheduling system 200 for 256 entry counts. Point 812 provides that 2683 area units are used for a scheduling system 200 for 512 entry counts. As shown by the curve 800, the area efficiency of the scheduling system 200 with respect to the entry count is close to O(N), where N represents the entry count. Note that many conventional scheduling systems have an area efficiency of $O(N^2)$. As such, by using a mask including previous grant result information to mask the received requests, the area efficiency of the scheduling system 200 is improved.

It is noted that various configurations (e.g., the entry count of the scheduling system 200, the types of the priority encoder circuit 208) illustrated in FIGS. 2A, 2B, 3, 4, 5, 6, 7, 8 are exemplary only and not intended to be limiting beyond what is specifically recited in the claims that follow. It will be understood by those skilled in that art in possession of this disclosure that other configurations may be used. For example, the round-robin arbiters of the scheduling systems 200 and 250 may be used as a sub-component for implementing other round-robin arbiters such as the weighted round-robin arbiter. For further example, the design implementations including the logic gates illustrated in FIGS. 3 and 5 are illustrative only, and the functions of those logic gates may be implemented using equivalent logics. For further example, the translator 402 of the find-first-set bit logic may use a cascaded structure for a large input word 214 to reduce the number of storage units (e.g., LUTs) needed to such a large input word 214.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A scheduling system, comprising:
a request masking circuit configured to:
receive a sequence of original requests for priority arbitration among a plurality of entries, the sequence of original requests including a first original request following a last original request;
receive, from a mask generator circuit, a last mask associated with a last grant result for the last original request, the last grant result assigning priority to a last granted entry of the plurality of entries; and
generate a first masked request by applying the last mask to the first original request;
a request selection circuit configured to generate a first selected request by selecting one of the first original request and the first masked request based on the first masked request; and
the mask generator circuit configured to generate a first mask based on the first selected request, wherein the first mask is associated with a first grant result for the first original request, the first grant result assigning priority to a first granted entry of the plurality of entries.

2. The scheduling system of claim 1, further comprising:
a priority encoder circuit configured to receive the first selected request and generate the first grant result based on the first selected request.

3. The scheduling system of claim 1, wherein the request selection circuit is configured to:
determine that the first masked request includes at least one entry request from one of the plurality of entries; and
generate the first selected request by selecting the first masked request.

4. The scheduling system of claim 1, wherein the request selection circuit is configured to:
determine that the first masked request does not include any entry request from one of the plurality of entries; and
generate the first selected request by selecting the first original request.

5. The scheduling system of claim 1, wherein the request selection circuit includes a multiplexer for generating the first selected request.

6. The scheduling system of claim 2, wherein the priority encoder circuit includes a find-first-set bit circuit configured to identify a least significant position of a bit set to one in the first selected request; and
wherein the first grant result assigns the priority based on the least significant position.

7. The scheduling system of claim 6, wherein the mask generator circuit includes:
a translator circuit configured to:
receive the first selected request having n bits;
generate n n-bit patterns, each pattern corresponding to one bit position of the first selected request;
wherein in response to the one bit position of the first selected request having a logic 1 value, the translator circuit is configured to generate the corresponding pattern having a logic 1 value in a corresponding bit position of the n-bit pattern, a logic 1 value in each bit position left of the corresponding bit position of the n-bit pattern, and a logic 0 value in each bit position right of the corresponding bit position of the corresponding pattern;
wherein in response to the one bit position of the first selected request having a logic 0 value, the translator circuit is configured to generate the corresponding pattern having a logic 0 value in each bit position of the corresponding pattern;
a merger circuit coupled to receive the n n-bit patterns and configured to combine the n n-bit patterns into one merged n-bit pattern; and
a shift circuit coupled to receive the merged n-bit pattern and configured to generate the first mask by left shifting the merged n-bit pattern by one bit with a logic 0 value shifted in.

8. The scheduling system of claim 7, wherein the find-first-set bit circuit includes an edge detector circuit configured to:
receive the merged n-bit pattern and the first mask; and
generate the first grant result using the merged n-bit pattern and the first mask.

9. The scheduling system of claim 8, wherein the first grant result is generated by applying a bit-wise logic XOR function to the merged n-bit pattern and the first mask.

10. The scheduling system of claim 2, wherein the mask generator circuit is configured to:
receive the first grant result from the priority encoder circuit; and
generate the first mask using the first grant result.

11. A method, comprising:
receiving a sequence of original requests for priority arbitration among a plurality of entries, the sequence of original requests including a first original request following a last original request;
receiving, from a mask generator circuit, a last mask associated with a last grant result for the last original request, the last grant result assigning priority to a last granted entry of the plurality of entries;
generating a first masked request by applying the last mask to the first original request;
generating, by a request selection circuit, a first selected request by selecting one of the first original request and the first masked request based on the first masked request; and
generating a first mask based on the first selected request, wherein the first mask is associated with a first grant result for the first original request, the first grant result assigning priority to a first granted entry of the plurality of entries.

12. The method of claim 11, further comprising:
generating, by a priority encoder circuit, the first grant result based on the first selected request.

13. The method of claim 11, further comprising:
determining that the first masked request includes at least one entry request from one of the plurality of entries; and
generating the first selected request by selecting the first masked request.

14. The method of claim 11, further comprising:
determining that the first masked request does not include any entry request from one of the plurality of entries; and
generating the first selected request by selecting the first original request.

15. The method of claim 11, further comprising:
generating, using a multiplexer in the request selection circuit, the first selected request.

16. The method of claim 12, further comprising:
identifying, by a find-first-set bit circuit included in the find-first-set circuit, a least significant position of a bit set to one in the first selected request, wherein the first grant result assigns the priority based on the least significant position.

17. The method of claim 16, further comprising:

receiving, by a translator circuit of the mask generator circuit, the first selected request having n bits;

generating, by the translator circuit of the mask generator circuit, n n-bit patterns, each pattern corresponding to one bit position of the first selected request;

wherein in response to the one bit position of the first selected request having a logic 1 value, the translator circuit is configured to generate the corresponding pattern having a logic 1 value in a corresponding bit position of the n-bit pattern, a logic 1 value in each bit position left of the corresponding bit position of the n-bit pattern, and a logic 0 value in each bit position right of the corresponding bit position of the corresponding pattern;

wherein in response to the one bit position of the first selected request having a logic 0 value, the translator circuit is configured to generate the corresponding pattern having a logic 0 value in each bit position of the corresponding pattern;

combining, by a merger circuit of the mask generator circuit, the n n-bit patterns into one merged n-bit pattern; and generating the first mask by left shifting the merged n-bit pattern by one bit with a logic 0 value shifted in.

18. The method of claim 17, further comprising:

receiving, by an edge detector of the find-first-set bit circuit, the merged n-bit pattern and the first mask; and generating, by an edge detector, the first grant result using the merged n-bit pattern and the first mask.

19. The method of claim 18, further comprising:

generating the first grant result by applying a bit-wise logic XOR function to the merged n-bit pattern and the first mask.

20. The method of claim 12, further comprising:

receiving the first grant result from the priority encoder circuit; and generating the first mask using the first grant result.

* * * * *